United States Patent [19]

Morimoto

[11] Patent Number: 5,746,089
[45] Date of Patent: May 5, 1998

[54] PLANETARY GEAR-TYPE STARTER

[75] Inventor: Yoshihiro Morimoto, Tokyo, Japan

[73] Assignee: Mitsubishi Denki Kabushiki Kaisha, Tokyo, Japan

[21] Appl. No.: 795,307

[22] Filed: Feb. 4, 1997

[30] Foreign Application Priority Data

Jul. 8, 1996 [JP] Japan ................... 8-177818

[51] Int. Cl.$^6$ ................... H02K 7/00; F02N 11/00
[52] U.S. Cl. ................... 74/7 E; 192/55.1; 475/265; 464/45
[58] Field of Search ............. 74/7 E; 192/56.1, 192/55.1; 475/263, 264, 265; 464/42, 45

[56] References Cited

U.S. PATENT DOCUMENTS

| | | | |
|---|---|---|---|
| 4,494,414 | 1/1985 | Hamano | 74/7 E |
| 4,528,470 | 7/1985 | Young et al. | 74/7 E |
| 4,635,489 | 1/1987 | Imamura et al. | 74/7 E |
| 4,924,108 | 5/1990 | Isozumi et al. | |
| 5,113,084 | 5/1992 | Isozumi et al. | |
| 5,263,906 | 11/1993 | Antonov | 475/257 |
| 5,323,663 | 6/1994 | Ohgi et al. | 74/7 E |
| 5,533,415 | 7/1996 | Ackermann et al. | 74/7 E |

FOREIGN PATENT DOCUMENTS

| | | | |
|---|---|---|---|
| 3225957A1 | 1/1984 | Germany | 74/7 E |
| A-4-136481 | 5/1992 | Japan | |
| A-4-65963 | 6/1992 | Japan | |

*Primary Examiner*—Khoi Q. Ta
*Assistant Examiner*—David M. Fenstermacher
*Attorney, Agent, or Firm*—Sughrue, Mion, Zinn, Macpeak & Seas, PLLC

[57] ABSTRACT

In a starter including a planetary gear reducer for reducing a rotational output of a motor and transmitting the reduced rotational output to a starting object, the motor includes an armature 3, a motor output shaft 31 and a cylindrical yoke 1. The planetary gear reducer includes a ring gear 8 fitted in and engaged with the yoke at its one end and having an inner peripheral gear portion 11 formed on the inner periphery thereof, a bearing 13 mounted on the side wall of the ring gear at the center thereof, a plurality of planetary gears 4 rotatably interposed between the outer peripheral gear portion 32 of the motor output shaft and the inner peripheral gear portion of the ring gear and a starter output shaft 21 rotatably supported by the ring gear side wall, the starter output shaft being connected at its one end with the planetary gears and adapted to be engageable at its other end with the starting object. The ring gear is fixed to the cylindrical yoke against rotation relative thereto but permitted to rotate relative thereto in a circumferential direction of the yoke only when a rotational torque applied to the ring gear exceeds a predetermined value.

4 Claims, 3 Drawing Sheets

PLANETARY GEAR-TYPE STARTER

BACKGROUND OF THE INVENTION

1. Field of the Invention

The present invention relates to a planetary gear-type starter for reducing the rotation of an output shaft of a motor through planetary gears and transmitting the reduced rotation to a starting object such as an engine, and more specifically, to a planetary gear-type starter for preventing the damage thereof which might be caused when rotational torque of the starting object is suddenly changed by an abrupt increase or decrease in the load of the starting object which is coupled with a starter output shaft.

2. Description of the Related Art

Conventionally, there is used a planetary gear-type starter incorporating a planetary gear reducer for driving a starting object such as, for example, a crank shaft of an automobile engine upon starting thereof.

FIG. 3 is a side elevational view, partly in cross section, of a conventional planetary gear-type starter having a yoke 1 to which an inner peripheral gear portion 11 of a planetary gear reducer is formed integrally therewith.

In this connection, it is to be noted that when a ring gear or an internal gear (not shown) having an inner peripheral gear portion is formed separately from and mounted to the yoke 1, the internal gear is integrally fixed to the yoke 1 through a detent mechanism for rotation therewith.

In FIG. 3, the cylindrical yoke 1 acting as a magnetic field magnet of a motor of the planetary gear-type starter includes the annular inner peripheral gear portion 11 formed on an inner periphery thereof adjacent to a thick side wall or a bottom portion 12, a bearing 13 provided in an opening 15 of the bottom portion 12 at the center thereof and a thin cylindrical portion 14 formed at an opening side confronting the bottom portion 12.

A flange unit 2 journaled by the bearing 13 has an annular flange 2a extending into the yoke 1 and a plurality of pins 22 standing on an end surface of the flange 2a. The respective pins 22 are concentrically disposed on a circle with its center coinciding with the center axis of rotation of the flange unit 2. A plurality of planetary gears 4 are rotatably mounted on the pins 2, respectively. A flange 22a is attached to one end of each pin 22 so as to prevent the planetary gear 4 mounted thereon from falling out.

In this case, the pins 22 having the flanges 22 a are fixed to the annular flange 2a of the flange unit 2 in the state that the planetary gears 4 are mounted on the pins 22 when the planetary gears 4 are assembled.

A reducer is mounted on the flange unit 2 on the end surface side thereof in the yoke 1 which is in cooperation with the inner peripheral gear portion 11 and the planetary gears 4. The other end of the flange unit 2 is fixed to a starter output shaft 21 of the starter so as to transmit the rotational output or torque of the motor to the starter output shaft 21 through the planetary gear reducer.

An annular projecting portion 12a projecting in the axial direction of the starter output shaft 21 is integrally formed with the bottom portion 12 at the opening 15 so as to secure a sufficient bearing supporting length in the axial direction so that the projecting portion 12a cooperates with the bottom portion 12 to support the bearing 13 in a reliable manner. With this arrangement, even if the bottom portion 12 has a relatively thin thickness, the bearing 13 can be firmly fitted into the opening 15 and securely supported by the bottom portion 12 and the annular projecting portion 12a, so that miniaturization is realized by reducing the thickness of the bottom portion 12.

An extreme or outer end of the starter output shaft 21 is journaled by a bearing 51 in a bracket 5 which covers a front portion of the yoke 1. An overrunning clutch 24 and a pinion gear 25 are mounted on an intermediate portion of the starter output shaft 21 for axial movement relative thereto. The bracket 5 is fixed to the outer peripheral end surface of the bottom portion 12 of the yoke 1.

When the starter is operated, the overrunning clutch 24 and the pinion gear 25 move in the direction of an arrow while rotating integrally with the starter output shaft 21, so that they drive a starting object such as for example, the crank shaft of an automobile engine through a gear portion on the outer periphery of the pinion gear 25.

A starter motor, which is energized at the time of start, includes a rotor or an armature 3 fixedly mounted on or coupled with a motor output shaft 31, a permanent magnet 33 acting as a field magnet and the yoke 1. The permanent magnet 33 is magnetized in a radial direction and generates flux in the peripheral direction plunger for moving the overrunning clutch 24.

A shift lever 7 is rotatably mounted on a rotatable shaft 71 and has one end engaged with the unillustrated plunger in the switching device 6 and the other end engaged with the overrunning clutch 24. The shift lever 7 is rotated counterclockwise about the rotatable shaft 71 when the plunger is driven so as to move the overrunning clutch 24 and the pinion gear 27 on the starter output shaft 21 in the direction of the arrow (i.e., in the rightward direction in FIG. 3) relative thereto.

Next, operation of the conventional planetary gear-type starter shown in FIG. 3 will be described.

First, before the starter is operated, the shift lever 7 is located in the state shown in FIG. 3, the overrunning clutch 24 and the pinion gear 25 is not engaged with the unillustrated starting object such as the engine crank shaft.

When the starter is operated by turning on the unillustrated key switch, the armature 3 of the motor is energized by the electric power supplied from the switching device 6 and is driven to rotate together with the motor output shaft 31 integrally connected with the armature 3. In addition, the shift lever 7 is driven by the plunger in the switching device 6 to rotate counterclockwise about the rotatable shaft 71 so as to move the overrunning clutch 24 in the direction of the arrow in FIG. 3, thus causing the pinion gear 25 to engage the unillustrated starting object.

At the time, the rotational torque output from the armature 3 of the motor is transmitted to the planetary gears 4 from the sun gear or outer peripheral gear portion 32 of the motor output shaft 31. With this operation, the planetary gears 4 turn between the outer peripheral gear portion 32 of the motor output shaft 31 and the inner peripheral gear portion 11 of the yoke 1 while rotating about the pins 22.

The flange unit 2, on which the planetary gears 4 are rotatably mounted, is rotated by orbital motion or revolution of the planetary gears 4 around the sun gear 32 at a rotational speed which is reduced with respect to the rotational speed of the motor output shaft 31, so that the reduced rotational output is transmitted to the starter output shaft 21.

The starter output shaft 21 rotates the pinion gear 25 through the overrunning clutch 24 at the reduced rotational speed.

However, a relatively large amount of rotational torque may be suddenly imposed on the starter output shaft 21 at such a time as when the starting object such the engine crank shaft being coupled with the starter output shaft 21 is suddenly stopped, or when the starter output shaft 21 which is being driven in rotation before it is coupled with the crank shaft is suddenly coupled therewith, or on the like occasions.

In this case, the rotational torque transmitted from the flange unit 2 at the one end of the starter output shaft 21 to the planetary gears 4 is transmitted to the yoke 1 through the inner peripheral gear portion 11 and also to the motor output shaft 31 through the outer peripheral gear portion 32.

At this time, since the inner peripheral gear portion 11 is formed integrally with the yoke 1, there is a possibility that the suddenly changed rotational torque on the load side is directly imposed on the yoke 1 and the motor output shaft 31 through the planetary gear reducer and damages the gragile portion in the starter.

In the conventional planetary gear-type starter, since inner peripheral gear portion 11 of the planetary gear reducer is integrally formed and hence fixed to the yoke 1, there is a possible problem that when rotational torque imposed on the starter output shaft 21 is suddenly changed, resulting impact cannot be absorbed, thus damaging components of the starter.

The present invention is intended to solve the above problem and has for its object to provide a planetary gear-type starter capable of preventing the occurrence of damage resulting from a sudden change in rotational torque caused when a load on a starting object, which is coupled with a starter output shaft, is increased suddenly.

SUMMARY OF THE INVENTION

A planetary gear-type starter according to the present invention comprises a motor having a cylindrical yoke, an output shaft and an armature fixedly mounted on the output shaft for integral rotation therewith and disposed in the cylindrical yoke; and a planetary gear reducer for reducing a rotational output of the motor and transmitting the reduced rotational output to a starting object. The planetary gear reducer comprises a ring gear having an inner peripheral gear portion formed at an inner periphery thereof and being engaged at its outer periphery with the cylindrical yoke; a sun gear formed on the outer periphery of the motor output shaft; a plurality of planetary gears disposed between the inner peripheral gear portion of the ring gear and the sun gear so as to be in meshing engagement with the inner peripheral gear portion and the sun gear; and a start output shaft connected at its one end with the planetary gears for relative rotation with respect thereto as well as revolution about the sun gear together with the planetary gears, the starter output shaft being rotatably supported by the ring gear and adapted to be engageable at its other end with the starting object; wherein the ring gear is normally fixed to the cylindrical yoke against rotation relative thereto but permitted to rotate relative thereto in a circumferential direction of the yoke only when a rotational torque applied to the ring gear exceeds predetermined value.

In a preferred form of the invention, the cylindrical yoke comprises a cylindrical portion having a diametrically enlarged offset portion with an annular shoulder formed at one end thereof, the ring gear being fitted in and engaged with the offset portion, and plate means is disposed and fixedly held between the shoulder and an end surface of the ring gear in such a manner that it is disposed between an end of the armature and an adjacent end of each of the planetary gears.

DESCRIPTION OF THE PREFERRED EMBODIMENTS

Preferred embodiments of the present invention will be described below in detail while referring to the accompanying drawings.

Embodiment 1

Figure 1:
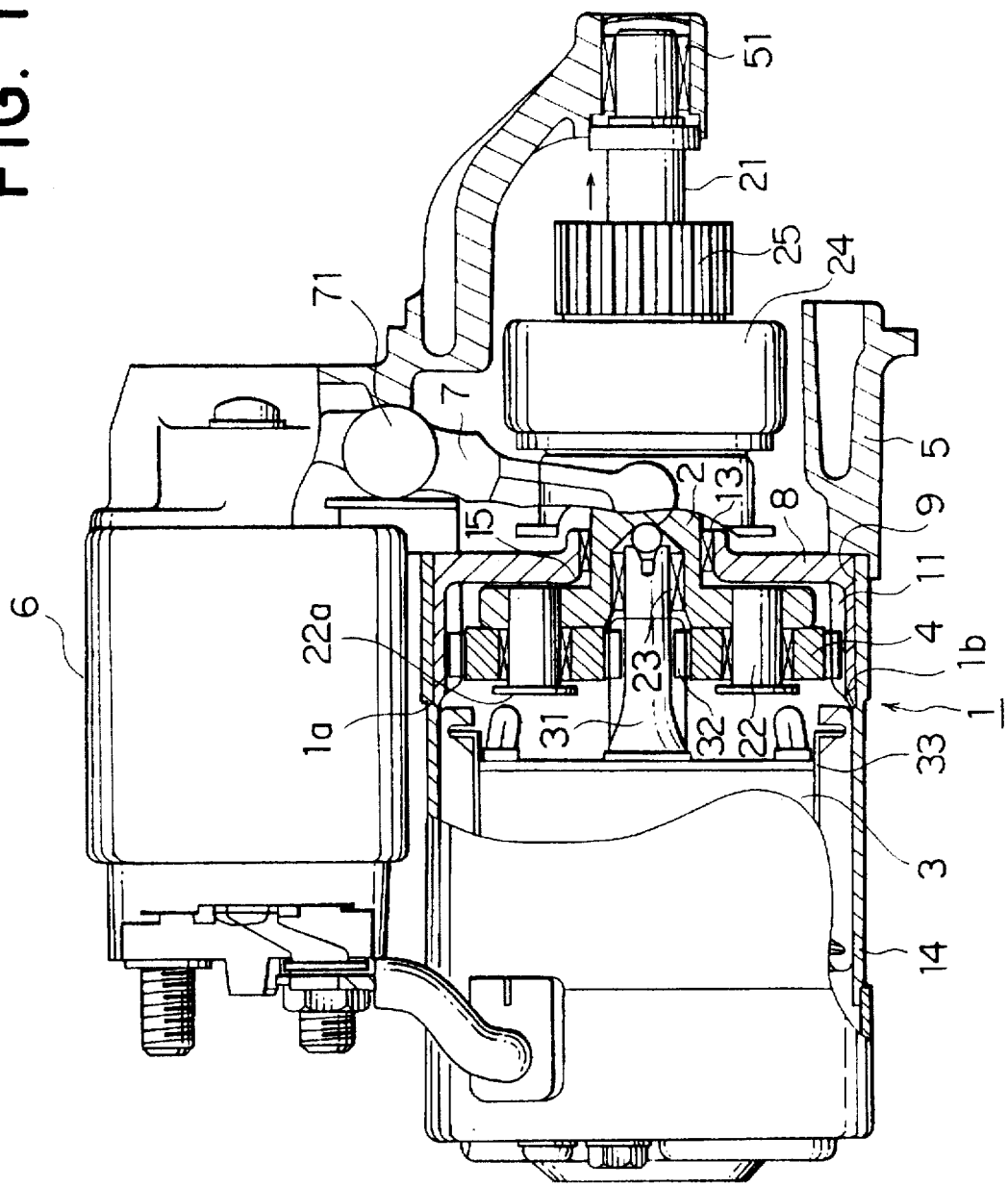
FIG. 1 is a side elevational view, partly in cross section, of an embodiment 1 of the present invention.
Figure 3:
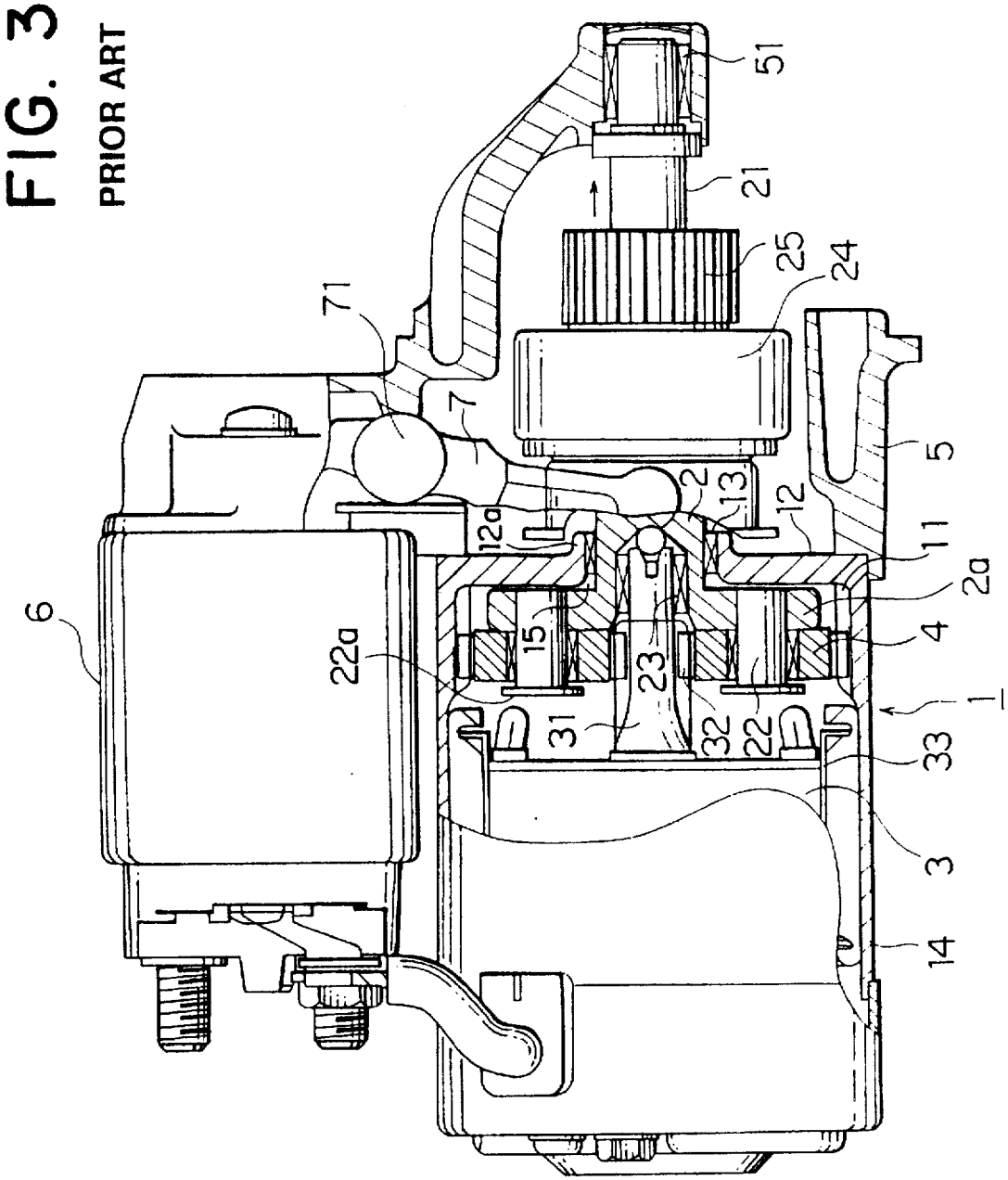
FIG. 3 is a side elevational view, partly in cross section, of a conventional planetary gear-type starter.

A first embodiment of the present invention will be described below with reference to FIG. 1, wherein the same components as those in the above prior art (see FIG. 3) are denoted by the same numerals as used in the above-mentioned prior art and the description thereof is omitted.

In this embodiment, a yoke 1 is composed of only a thin cylindrical portion 14 having at its one end a diametrically enlarged offset portion 1a integrally formed therewith with an annular shoulder 1b formed at its one end. The offset portion 1a is formed on its inner periphery with an annular engagement portion formed of recess 9 into which a ring gear or an internal gear 8 is fitted or engaged through a predetermined interference.

An inner peripheral gear portion 11 is formed on the inner periphery of the internal gear 8 so as to rotatably accommodate planetary gears 4, and a bearing 13 is disposed and fitted in the central opening in the internal gear 8 for journaling a starter output shaft 21 at its end.

The recess 9 between the one end of the yoke 1 and the internal gear 8 serves to permit the internal gear 8 to slide in the yoke 1 in a circumferential direction when a rotational torque larger than a predetermined value is imposed on the internal gear 8.

Operation of this embodiment of the present invention will be described below. Since the ordinary rotational operation and the speed reducing operation of this embodiment are the same as those of the aforementioned prior art of FIG. 3, the description thereof is omitted here.

According to this embodiment, when the rotational torque to be imposed on the starter output shaft 21 is suddenly changed when an unillustrated starting object in the form of a crank shaft of an engine, which is operatively connected with the starter output shaft 21 so as to be thereby driven to rotate, is suddenly stopped, or when the starter output shaft 21 is suddenly coupled with the crank shaft, or on like occasions, the rotational torque transmitted from the flange unit 2 of the starter output shaft 21 to the planetary gears 4 causes the internal gear 8 to relatively slide and rotate in the recess 9 of the offset portion 1a of the yoke 1 in its circumferential direction when the rotational torque is greater than a predetermined value.

With this operation, since excessive impact resulting from the sudden change of the rotational torque is absorbed by the sliding motion of the internal gear 8 relative to the offset portion 1a of the yoke 1, it is not transmitted to the yoke 1 and the motor output shaft 31, so that the components in the starter can be prevented from being damaged.

Embodiment 2

Although a flange 22a is formed on an end of each of the pins 22 in the first embodiment to prevent the planetary gear 4 from falling out, a plate means may be interposed between an end surface of an armature 3 and an adjacent end surface of each of the planetary gears 4.

Figure 2:
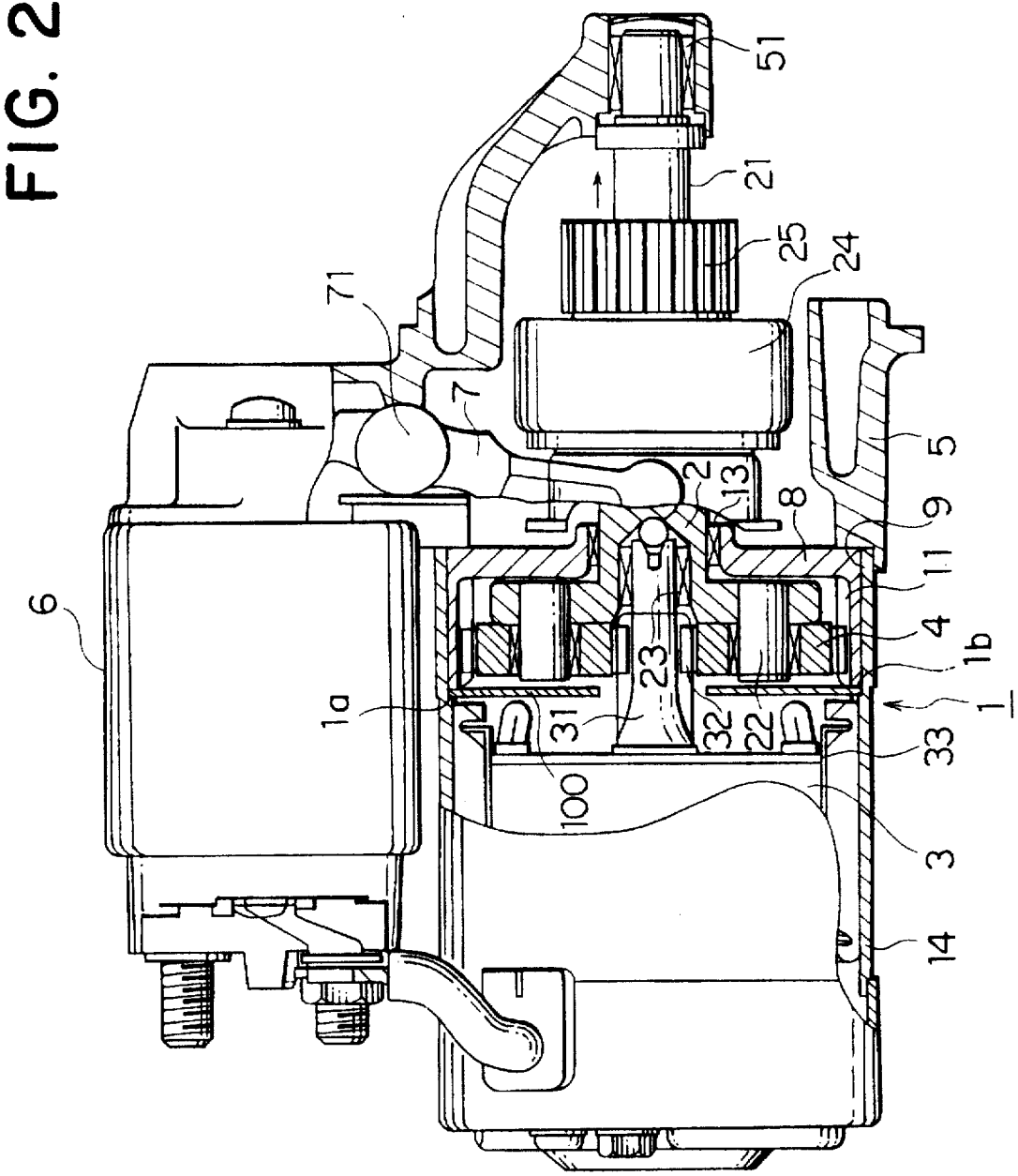
FIG. 2 is a side elevational view, partly in cross section, of an embodiment 2 of the present invention.

FIG. 2 is a side elevational view, partly in cross section, of another embodiment of the present invention which is provided with a plate means in the form of a plurality of plates 100 for preventing the planetary gears 4 from falling out.

The plates 100 are aligned with and clampingly held together between the end surface of the internal gear 8 and the shoulder 1b on the inner periphery of the diametrically enlarged offset portion 1a.

In this case, the flanges 22a of the pins 22 can be omitted.

When the planetary gears 4 are assembled, the pins 22 are first mounted on an end surface of a flange unit 2, and the plates 100 are then assembled after the planetary gears 4 have been mounted on the pins 22. As a result, the degree of freedom of an assembling process is increased and assembly can be made easily.

Moreover, a planetary gear-type starter can be obtained which is capable of preventing damage caused by a sudden change in the rotational torque of a starting object operatively coupled with the starter output shaft when the load on the starting object is suddenly increased.

Further, a planetary gear-type starter which is easy to assemble can be obtained.

What is claimed is:

1. A planetary gear-type starter comprising:

a motor having a cylindrical yoke, an output shaft and an armature fixedly mounted on said output shaft for integral rotation therewith and disposed in said cylindrical yoke; and a planetary gear reducer for reducing a rotational output of said motor and transmitting the reduced rotational output to a starting object;

said planetary gear reducer comprising:

a ring gear having an inner peripheral gear portion formed at an inner periphery thereof and being engaged at its outer periphery with said cylindrical yoke;

a sun gear formed on the outer periphery of said motor output shaft;

a plurality of planetary gears disposed between said inner peripheral gear portion of said ring gear and said sun gear so as to be in meshing engagement with said inner peripheral gear portion and said sun gear; and a starter output shaft connected at its one end with said planetary gears for relative rotation with respect thereto as well as revolution about said sun gear together with said planetary gears, said starter output shaft being rotatably supported by said ring gear and adapted to be engageable at its other end with the starting object;

wherein said ring gear is normally fixed to said cylindrical yoke against rotation relative thereto but permitted to rotate relative thereto in a circumferential direction of said yoke only when a rotational torque applied to said ring gear exceeds a predetermined value wherein said cylindrical yoke comprises a cylindrical portion having a diametrically enlarged offset portion with an annular shoulder formed at one end thereof, said ring gear being fitted in and engaged with said offset portion, and wherein a plate is disposed and fixedly held between said shoulder and an end surface of said ring gear in such a manner that said plate is disposed between an end of said armature and an adjacent end of each of said planetary gears.

2. A planetary gear-type starter comprising:

a motor having a cylindrical yoke, an output shaft and an armature fixedly mounted on said output shaft for integral rotation therewith and disposed in said cylindrical yoke; and a planetary gear reducer for reducing a rotational output of said motor and transmitting the reduced rotational output to a starting object;

said planetary gear reducer comprising:

a ring gear having an inner peripheral gear portion formed at an inner peripheral surface thereof and being frictionally engaged at an outer peripheral surface thereof with an inner peripheral surface of said cylindrical yoke;

a sun gear formed on the outer periphery of said motor output shaft;

a plurality of planetary gears disposed between said inner peripheral gear portion of said ring gear and said sun gear so as to be in meshing engagement with said inner peripheral gear portion and said sun gear; and a starter output shaft connected at its one end with said planetary gears for relative rotation with respect thereto as well as revolution about said sun gear together with said planetary gears, said starter output shaft being rotatably supported by said ring gear and adapted to be engageable at its other end with the starting object;

wherein said ring gear is normally frictionally engaged with said cylindrical yoke to prevent relative rotation therebetween but permitted to rotate relative thereto in a circumferential direction of said yoke only when a rotational torque applied to said ring gear exceeds a predetermined value.

3. A planetary gear-type starter as recited in claim 2, wherein said inner peripheral surface of said ring gear where said inner peripheral gear portion is formed is directly opposite said outer peripheral surface of said ring gear that frictionally engages said inner peripheral surface of said cylindrical yoke.

4. A planetary gear-type starter as recited in claim 2, wherein said outer peripheral surface of said ring gear and said inner peripheral surface of said cylindrical yoke are coaxial inner peripheral surface of said cylindrical yoke are coaxial with, and extend substantially parallel to, said output shaft of said motor.

* * * * *